No. 806,526. PATENTED DEC. 5, 1905.
C. M. DALY.
WATER HEATER.
APPLICATION FILED APR. 26, 1905.
2 SHEETS—SHEET 1.
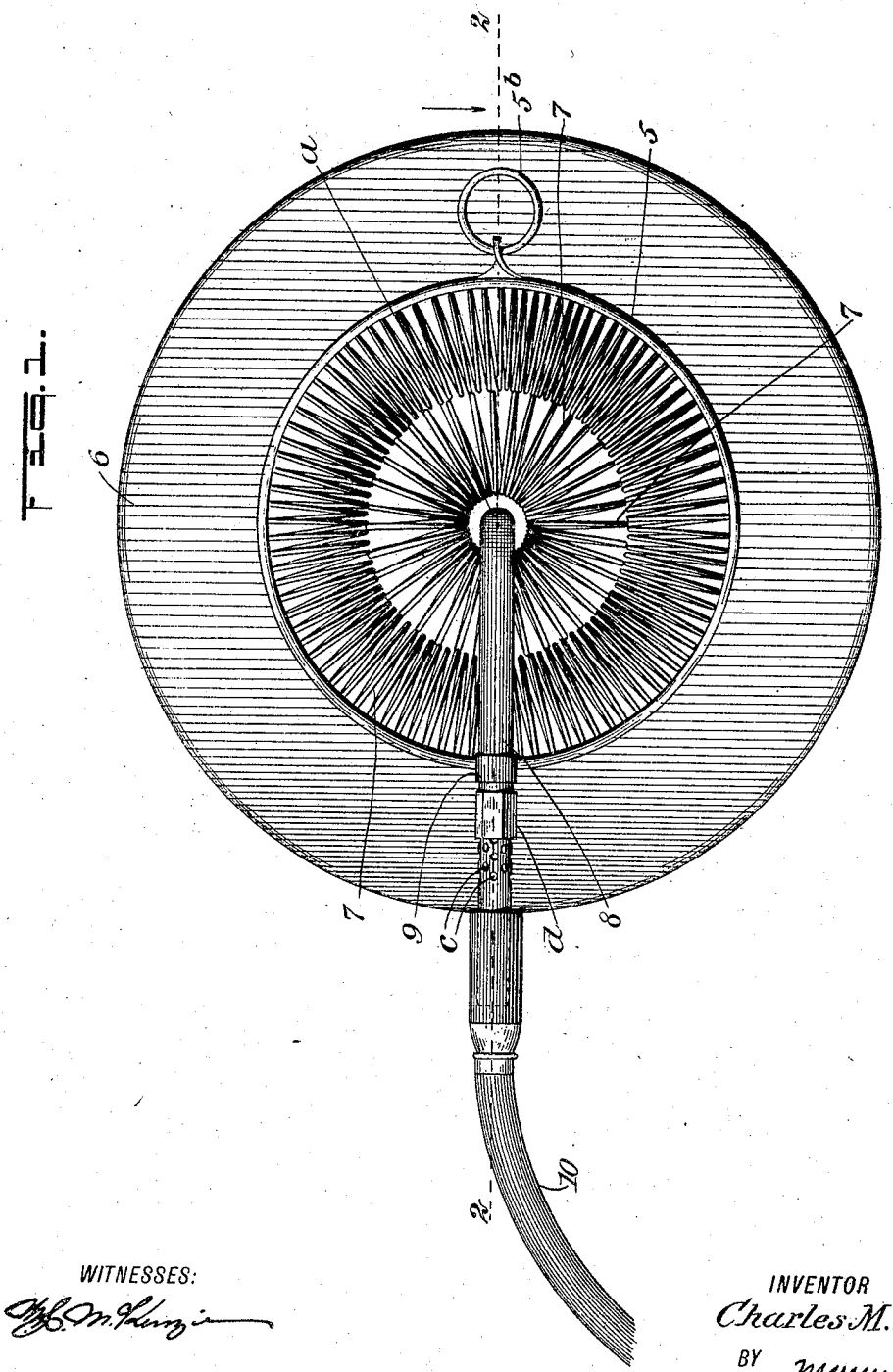
WITNESSES:
INVENTOR
Charles M. Daly
BY
ATTORNEYS

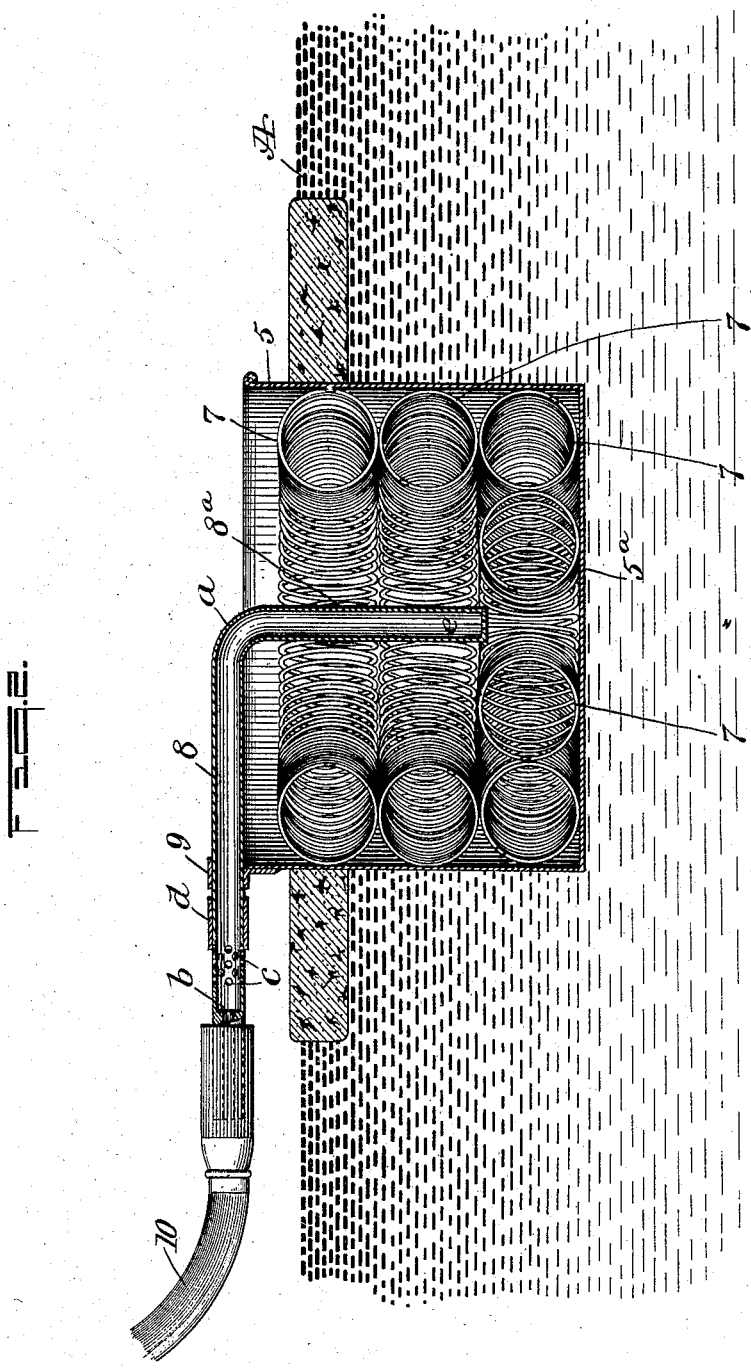

UNITED STATES PATENT OFFICE.

CHARLES MICHEL DALY, OF NEW YORK, N. Y.

WATER-HEATER.

No. 806,526.        Specification of Letters Patent.        Patented Dec. 5, 1905.

Application filed April 26, 1905. Serial No. 257,446.

*To all whom it may concern:*

Be it known that I, CHARLES MICHEL DALY, a citizen of the United States, and a resident of the city of New York, borough of Manhattan, in the county and State of New York, have invented a new and Improved Water-Heater, of which the following is a full, clear, and exact description.

The invention relates to means for heating water in a receptacle as it may be required, and has for its object the provision of a compact portable water-heating device of novel construction, which may be floated in water to be heated in a bath-tub or basin and which in service will quickly heat the water, a further object being to so construct a water-heating device that it, while floating in the water it is to heat, may be supplied with gaseous fuel from a source of gas-supply near the water-holder, which may be a fixed basin or a bath-tub.

The invention consists in the novel construction and combination of parts, as is hereinafter described, and indicated in the claims.

Reference is to be had to the accompanying drawings, forming a part of this specification, in which similar characters of reference indicate corresponding parts in both figures.

Figure 1 is a plan view of the device; and Fig. 2 is a sectional side view substantially on the line 2 2 of Fig. 1, showing the device floating in a body of water.

The heat-radiator comprises a preferably sheet-metal shell 5, which, as shown, is in the form of a vessel having a cylindrical side wall and closed at the normally lower end by a flat bottom wall $5^a$.

A float 6 is mounted upon the shell 5, near the upper end of the same, said float consisting of a ring which may have a circular or angular periphery.

The float 6 may be of cork or light wood and has sufficient area to adapt it to buoy the shell 5 and the heating means contained therein, so that the preferably open top of the shell will be supported above a body of water A, which may be held in a bath-tub, a washbasin, or other receptacle wherein water is to be heated. Within the shell 5 a plurality of ring-shaped spiral coils 7, formed of wire of a suitable gage, are placed, these coils having close contact with the inner surface of the side and bottom walls of said shell and also with each other, as is plainly shown in Fig. 2. A heater for the coils 7 is provided embodying a tube bent at $a$, so as to afford a depending member $8^a$. The horizontal portion 8 of the bent tube is formed with a nozzle end having reduced diameter in its bore, as indicated by full and dotted lines in Fig. 2 at $b$, forming a jet-orifice for the inflow of gas to the burner.

Near the nozzle end $b$ a plurality of perforations $c$ are formed in the wall of the horizontal portion 8 for the inflow of air, and a sleeve $d$ is mounted slidably on the tube and may be moved toward the jet-nozzle $b$ and cover any number of the perforations $c$. In the closed lower end of the depending section $8^a$ a fine perforation $e$ is formed, and, as shown in Fig. 2, this depending section of the burner-tube is located centrally in the coil-rings 7, and its lower extremity is close to the bottom coil of the series of coils. The horizontal section of the burner-tube is located centrally in the coil of the series of coils. The horizontal section of the burner-tube is supported upon the shell 5 by a tubular bracket 9, fixed on the wall of said shell near its upper edge, so as to project above it and receive the tubular burner-section, as is shown in Fig. 2, whereby the burner complete is supported in operative position for use, as may be desired. A pliable hose of ordinary style (shown partially at 10 in the drawings) is connected with the nozzle end $b$ of the burner-tube portion 8 and thence extends to a gas-fixture (not shown) near the burner-tube and is therewith connected when the device is to be used for water-heating purposes.

Assuming that the body of water A is contained in a bath-tub or washbasin, the heater device if placed therein will float and the shell 5 be immersed therein up to the float 6. Upon turning gas under pressure into the hose 10 and lighting the jet of mixed gas and air that issues from the perforation $e$, and properly adjusting the sleeve $d$, so that air in proper volume will mix with the gas, a blue flame having intense heat will be projected from the lower end of the burner-body and quickly heat the wire coils 7. The intimate contact of the plurality of wire coils 7 with each other and upon the shell 5 will radiate the heat of the flame issuing at $e$ from the burner-jet and transmit the heat to the shell 5, which in turn will raise the temperature of the body of water A, so that in a short time it will be warmed sufficiently for lavatory use. A wire ring $5^b$ may be loosely secured on the shell 5 at its upper edge, which will afford convenient means for hanging up the heater device on a wall or other support when not in use.

It is obvious that the improvement may be used to heat water for laundry purposes and for heating water to wash dishes or general cleaning purposes and in service is a very convenient and reliable substitute for other means for heating water or other liquids.

Having thus described my invention, I claim as new and desire to secure by Letters Patent—

1. A heater for liquids, comprising a shell of thin metal having a closed bottom, and adapted to be partially immersed in the liquid, a gas-burner mounted on the shell and extending thereinto, a plurality of ring-shaped coils of wire arranged in the space between the side and bottom walls of the shell and the burner, and means for maintaining the shell at a predetermined level in the liquid.

2. A heater for liquids, comprising a shell of thin metal having a closed bottom and an open top and adapted to be partially immersed in the liquid, a gas-burner mounted on the shell and extending thereinto, and a plurality of ring-shaped coils of wire arranged in the space between the side and bottom walls of the shell and the burner.

3. A heater for liquids, comprising a shell of thin metal having a closed bottom and adapted to be partially immersed in the liquid, a gas-burner comprising a tube having a horizontal portion connected to the edge of the shell, and an angular portion extending to a point near the bottom thereof, and a plurality of ring-shaped coils of wire arranged in the space between the side and bottom walls of the shell and the burner.

In testimony whereof I have signed my name to this specification in the presence of two subscribing witnesses.

CHARLES MICHEL DALY.

Witnesses:
W. S. HENRY,
GUSEO WEIRHEINZ.